Patented Oct. 5, 1954

2,691,016

UNITED STATES PATENT OFFICE 2,691,016

SELENIDES OF HETEROCYCLIC AMINES

Chester W. Christensen, Akron, Ohio, assignor to Monsanto Chemical Company, St. Louis, Mo., a corporation of Delaware No Drawing. Application August 16, 1951, Serial No. 242,189

3 Claims. (Cl. 260—247)

This invention relates to new and useful compositions of matter. More particularly it relates to selenides of heterocyclic amines.

In accordance with this invention it has been found that the selenides of heterocyclic amines are a new family of highly useful chemicals.

The new chemicals may be readily prepared by condensing a selenium halide with a heterocyclic amine such as pyrrolidine, piperidine, the $\alpha$-, $\beta$-, and $\gamma$-pipecolines, morpholine, 1,4-thiazane, 1,4-selenazane, and the like.

The following is illustrative of the preparation of the new compounds:

EXAMPLE

To a suitable reaction vessel containing 87 parts by weight (substantially 1 mole) of morpholine dissolved in 352 parts by weight of benzene is added with agitation a solution containing 57.2 parts by weight (substantially 0.25 mole) of commercial selenium monochloride dissolved in 88 parts by weight of benzene while maintaining the temperature at $-5$ to $+10°$ C. Upon completion of the addition of the selenium monochloride the reaction mix is agitated for one hour while maintaining the temperature at about $0°$ C. The reaction mix is filtered and the filtrate evaporated yielding 20.6 parts by weight of a selenide of morpholine as a brick-red solid possessing a melting point of 90–95° C. Analysis indicated the product was essentially N,N'-triseleno-bis-morpholine. For example nitrogen found was 6.57% and 6.82% as compared to a calculated value of 6.84% for the triselenide.

Employing substantially the same reaction conditions the N,N'-selenides of pyrrolidine, piperidine, and $\alpha$-, $\beta$-, and $\gamma$-pipecoline are prepared by replacing morpholine with an equimolar amount, respectively, of pyrrolidine, piperidine, and $\alpha$-, $\beta$-, and $\gamma$-pipecoline.

In the preparation of the new compounds of this invention other selenium halides than the chlorides may be employed, for example selenium monobromide, selenium monoiodide, selenium tetrabromide, and the like.

The new compounds are useful as fast-curing vulcanization agents in the production of vulcanizates having low moduli and as illustrative thereof the following rubber stock is compounded in the usual manner:

|  | Parts by weight |
|---|---|
| Smoked sheets rubber | 100 |
| Carbon black | 50 |
| Zinc oxide | 5 |
| Stearic acid | 3 |
| Saturated hydrocarbon oil | 2 |
| p-Amino biphenyl-acetone condensation product | 1.5 |
| N-cyclohexyl benzothiazole sulfenamide | 0.8 |
| N,N'-di-seleno-bis-morpholine | 1.9 |

The above stock so compounded is vulcanized in the usual manner by heating in a press at 144° C. The physical properties of the 30 minute cure are set forth below:

Table

| Modulus of Elasticity in lbs./in.$^2$ at Elongations of— | | Ultimate Tensile lbs./in.$^2$ | Ultimate Elongation, percent |
|---|---|---|---|
| 300% | 500% | | |
| 1,493 | 2,906 | 2,986 | 530 |

What is claimed is:

1. As a new composition of matter N,N'-triseleno-bis-morpholine.

2. The method of making an N,N'-selenide of morpholine which comprises reacting a selenium halide with morpholine.

3. The method of making an N,N'-selenide of morpholine which comprises reacting selenium monochloride with morpholine.

References Cited in the file of this patent

UNITED STATES PATENTS

| Number | Name | Date |
|---|---|---|
| 2,433,179 | Wheeler | Dec. 23, 1947 |

OTHER REFERENCES

Kaufman: Chemical Abstracts, vol. 20, p. 1364 (1926).

Binz: J. Am. Chem. Soc., January 1940, pp. 7 and 8.